July 21, 1959 J. BRITO PEREZ 2,895,703
TELEPHONE SUPPORT
Filed Oct. 24, 1957

Inventor
José Brito Perez.
Attorney.

United States Patent Office 2,895,703
Patented July 21, 1959

2,895,703

TELEPHONE SUPPORT

José Brito Perez, Havana, Cuba

Application October 24, 1957, Serial No. 692,126
3 Claims. (Cl. 248—346)

This invention relates to a telephone support and more particularly to mobile supports for use on tables or desks.

The invention is more particularly concerned with a support for telephones of the portable type which include a relatively heavy base, now generally rectangular in plan but may be of other configuration, and which is provided with a finger receiving recess in an end wall thereof for facilitating lifting and transporting the telephone to different positions and locations as conditions may require. Telephones of this type are generally set on a small table expressly provided for such purpose. Due to the fact that a telephone resting upon a table may be aproched from different sides of the table for use thereof, it becomes necessary to move the telephone to the most accessible position of use. Since telephones are usually provided with table top protecting pads, it is difficult to slide the telephone on the table top from one position to another due to the substantial friction offered by said pads. Accordingly, it is often preferred by persons to insert their fingers into the recess in the telephone base and lift it to the desired position for use.

The foregoing disadvantages with telephones having table top engaging pads on the bases thereof have heretofore been noted and attempts to overcome these disadvantages have been made by the provision of mobile supports on the bottom of the base and in which instances the pads were not used. Mobile supports substantially overcome the disadvantage of difficult mobility of the telephone, however, they introduce a new objection which resides in the fact that, due to the weight of the telephone and the relative ease of movement of the telephone over the table top, in many instances such momentum is obtained that the telephone overruns the edge of the table top and falls to the floor with resulting damage to both the telephone and the table.

Having in mind the defects of the prior art apparatus, it is the primary object of this invention to provide a telephone support having table top engageable anti-friction rollers together with means for arresting movement of the support and for preventing damage to the table top upon the advance anti-friction rollers overrunning an edge of the table top.

Another object of the invention is to provide a support as above referred to on which standard dimension telephones of the character above referred to are removably supported.

A further object of the invention is to provide a mobile telephone support of the type described having simplicity of design, economy of construction and efficiency in operation.

The novel features that are considered characteristic of the invention are set forth with particularity in the appended claims. The invention itself, however, both as to its organization and its method of operation, together with additional objects and advantages thereof, will best be understood from the following description of a specific embodiment when read in connection with the accompanying drawings, wherein like reference characters indicate like parts throughout the several figures and in which:

Figures 1, 2, 3:
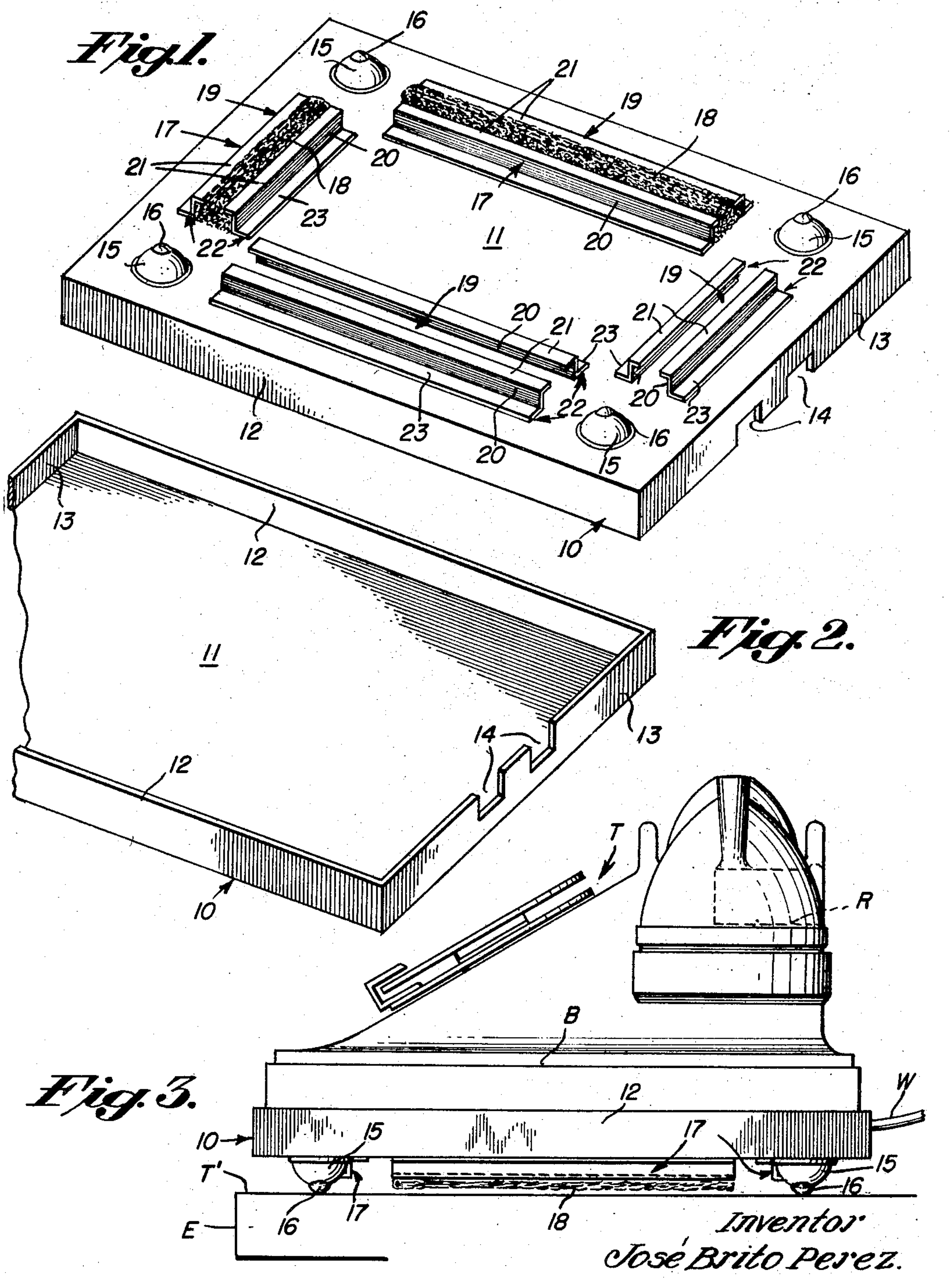
Figure 1 is a bottom perspective view of the improved telephone support in accordance with a preferred structural embodiment thereof, with certain elements omitted for greater clarity of illustration.
Figure 2 is a top perspective view of the telephone support.
Figure 3 is a side elevational view of the improved support with a telephone in operative association therewith.

Referring now in detail to the drawing, the improved support 10 is shown as of rectangular configuration specifically adapted for use with a telephone T having a relatively heavy base B of rectangular form in plan and which base is provided with a finger receiving recess R in a rear wall thereof for facilitating movement of the telephone to and from different positions. Telephones of this general character are usually provided with a table top protecting pad on each corner of the lower face of the base thereof. Obviously, the shape of the support 10 may be varied to correspond to the telephone base B with which it is to be used.

The support 10, in the rectangular form illustrated, includes a bottom wall 11 corresponding to the size and shape of the telephone base B and upstanding flange-like side walls for nesting the base B and in the present instance including opposite side walls 12 and opposite end walls 13. The end wall 13 which forms the rear end wall is provided with one or more notches 14 for accommodating the cable or wires W leading into the telephone base B. The dimensions of the support 10 are preferably such that the rectangular telephone base B will rest on the bottom wall 11 with the side and end walls 12 and 13 of the support generally conforming to the side and end walls of the telephone base B as is indicated in Figure 3.

The support 10 is provided with a foot 15 adjacent each of the four corners thereof and which depends from the bottom wall 11. The feet 15 may be of any desired form and each supports an anti-friction ball roller 16 for engagement with the table top T′ (Figure 3) to provide mobility for the support. The support 10 is further provided on its undersurface with retarding means for preventing it from completely overrunning the edge E of the table top T′ when moved from one position to another on the table. This retarding means comprises friction means 17 depending from the bottom wall 11 but spaced slightly above the plane common to the table engaging surfaces of the ball rollers 16 so that such friction means will not normally engage the surface of the table top T′, as clearly shown in Figure 3. If, however, one or both of the feet 15 on one side of the support should overrun the table edge E, the support 10 will then drop so that the friction means 17 engages the table top T′ and prevents the support 10 and telephone T from sliding over the table top edge E.

The friction means 17 may comprise a block or pad of spongy or yieldable surface protecting material secured to and extending over a major portion of the underside of the bottom wall 11. Preferably, however, this means may comprise individual strips 18 of material extending along the side edges of the bottom wall 11 between the feet 15 and, conveniently, these strips 18 may be secured to the bottom wall 11 by channel units 19 having depending side flanges 20 and inturned edge portions 21 for partially enclosing and retaining the strip pads 18. Rather than ordinary channel members, each channel unit 19 may comprise a pair of angle members 22 of Z-section, the edge portions 23 of which are secured to the underside of the bottom wall 11.

Having set forth the construction of the telephone support in accordance with a preferred structural embodiment thereof, its function and operation should be readily understood. The support 10, including the rollers 16 and pads 18, is capable of receiving the base B of the standard telephone T now in use, it being necessary only to lift the telephone T and then lower the base B into the pan-like form of the support 10 with the wires W disposed in the notches 14. Upon engagement of the anti-friction roller balls 16 with the table top T′, the lower exposed surfaces of the pads 18 will be clear of the table top T, as is clearly indicated in Figure 3.

The anti-friction roller balls 16 will not only provide for ease of movement of the telephone T over the table top T′ to most desired position for use, but it will have substantially no marring effect on the table top. Since the anti-friction roller balls 16 provide for rapid acceleration of the relatively heavy telephone T, it may easily attain such momentum that at least one of the advance rollers 16 will overrun an edge E of the table top T′ which may result at least in the support 10 dropping down on the table top and marring it, and the momentum may in fact be such as to cause the support to move a sufficient distance over the edge E as to drop from the table top onto the floor with possible resulting damage to the support or telephone, or to both.

By the provision of the friction pads 18, however, there is little likelihood of the support marring the table top or of falling therefrom onto the floor. Assuming that the pair of anti-friction roller balls 16 to the right in Figure 3 run over the adjacent edge of the table top T′, the longitudinal side pads 18 will engage the table top T′ and function to prevent marring thereof by the support 10 and will also function in the capacity of a brake due to their frictional engagement with the table top to effectively arrest movement of the support and telephone before they have advanced beyond the edge E to such an extent as to fall over the edge E of the table top onto the floor. Likewise, should the rollers adjacent a side edge of the support run over the adjacent edge E of the table top T′, the transverse end pads 18 will prevent damage to the table top as well as effect a braking action on the support to prevent it and the telephone from falling to the floor.

Although a certain specific embodiment of the invention has been shown and described, it is obvious that many modifications thereof are possible. The invention, therefore, is not to be restricted except insofar as is necessitated by the prior art and by the spirit of the appended claims.

What I claim is:

1. A support for a portable telephone comprising a tray-like member for receiving and supporting the base of a telephone, said member conforming substantially to the shape of the telephone base and having a bottom wall, a plurality of universally movable supporting elements depending from said bottom wall for engagement with a table top and supporting said member for movement in any direction on the table top, and nonscratching friction pad means depending from said bottom wall and extending between said supporting elements in both directions with the lower surface of said pad means disposed above the table top engaging plane of said supporting elements and engageable with the table top to arrest movement of said member only when at least one of said supporting elements overruns the edge of the table top and said member becomes tilted.

2. A support for a portable telephone comprising a rectangular pan-like member for receiving the rectangular base of the telephone and comprising a bottom wall, opposite side walls and opposite end walls, anti-friction table top engageable roller means depending from said bottom wall adjacent each corner thereof, a channel unit secured to said bottom wall adjacent each side wall and each end wall and providing an open ended channel having a longitudinal gap at the lower edges thereof, and an elongated friction pad removably disposed in each channel unit and projecting through said gap, the plane of the lower surfaces of said pads being disposed slightly above the engaging plane of said anti-friction roller means.

3. The structure according to claim 2, wherein said channel units each comprise a pair of angle elements disposed substantially in symmetrical relation to a center line of a pair of anti-friction roller means, said angle elements being of Z-section with one edge flange secured to the bottom wall of said member, with the other edge portions of each pair extending toward each other in spaced relation to provide said gap.

References Cited in the file of this patent

UNITED STATES PATENTS

| | | |
|---|---|---|
| 1,582,795 | Smith | Apr. 27, 1926 |
| 2,311,928 | Buehler | Feb. 23, 1943 |
| 2,823,042 | Gelbond | Feb. 11, 1958 |